3,326,758
CHOLESTEROL DERIVATIVES
Klaus Irmscher, Darmstadt, Klaus Brückner, Darmstadt-Eberstadt, Josef Krämer, Darmstadt, Karl-Heinz Bork, Griesheim, near Darmstadt, Rudolf Watzel, Nieder-Ramstadt-Trautheim, and Hans-Otto Voge, Ober-Ramstadt, Germany, assignors to E. Merck Aktiengesellschaft, Darmstadt, Germany
No Drawing. Filed Mar. 23, 1964, Ser. No. 354,158
Claims priority, application Germany, Mar. 21, 1963, M 56,198; Apr. 1, 1963, M 56,329
18 Claims. (Cl. 167—65)

This invention relates to cholesterol derivatives and particularly to those derivatives having a therapeutic activity.

It has been found that certain cholesterol derivatives substituted by nitrogen and/or oxygen in the side chain attached to the 17-position, have a retarding effect on the physiological synthesis of cholesterol. These compounds are also physiologically compatible, and are therefore suitable for the treatment of hypercholesteremia.

The new compounds are of the following formula:

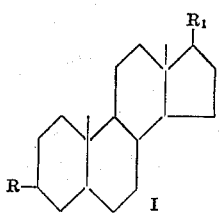

and its 5-dehydro derivatives and its acid-addition salts wherein:

R represents any of halo, preferably chloro, hydroxy-O-alkyl of 1–4 carbon atoms or O-acyl having 1–18 carbon atoms, $R_1$ represents any of

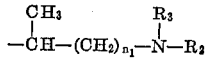

having a total of 6 to 10 carbon atoms,

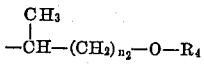

having a total of 6 or 7 carbon atoms,

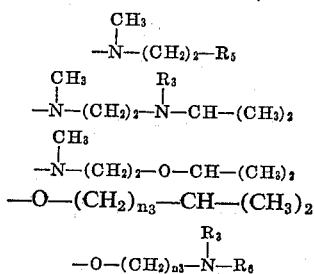

—O—(CH$_2$)$_{n_3}$—CH—(CH$_3$)$_2$

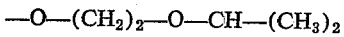

having a total of 4 to 7 carbon atoms, or

—O—(CH$_2$)$_2$—O—CH—(CH$_3$)$_2$ $R_2$ represents any of methyl, ethyl, isopropyl, isobutyl, isopentyl, 1-methyl-propyl, 1-ethyl-propyl, 2-methylbutyl, 2-ethylbutyl;

$R_3$ represents any of hydrogen, methyl or ethyl;

$R_4$ represents any of isopropyl, isobutyl, isopentyl or di-methylaminoethyl;

$R_5$ represents any of isopropyl, isobutyl, 1-methylpropyl or 1-ethylpropyl;

$R_6$ represents any of methyl, ethyl, or isopropyl;

$n_1$ is 0, 1, 2 or 3;

$n_2$ is 0, 1 or 2; and $n_3$ is 2 or 3;

and where a double bond can occur in the 5-position.

The new compounds can be produced in various ways. For example, conventional hydrogenation techniques can be employed starting with steroids of the above formula having a chlorine atom or a free or functionally altered hydroxyl group in the 3-position, and in the $R_1$ residue next to an NH— group, a CO— or CS— group, or in place of a —CH$_2$—NH— or >CH—NH— group a —CH=N— or >C=N group. Alternatively, in a steroid of Formula I, wherein $R_1$ has in place of the isoalkylamino group, an aryl —CH=N— group, the latter can be converted into the desired isoalkylamino group by treatment with a corresponding isoalkylhalide and subsequent hydrolysis. It is additionally possible in the corresponding primary steroid amine or isoalkyl amine to introduce the missing isoalkyl- or steroid-residue by known alkylating methods. It is also possible in a corresponding steroid of Formula I whose residue $R_1$ has an N-isoalkyl-N-acyl-amino group (where acyl designates the acid residue of a carboxylic or sulfonic acid), in place of an isoalkyl amino group, to liberate the isoalkyl amino group by the usual hydrolytic or alcoholytic methods.

Those cholesterol derivatives which have oxygen-containing side chains in the 17-position can be produced, e.g. by the usual etherizing methods. For example, a compound of Formula I which in the 3-position has a chlorine atom or a functionally altered hydroxyl group and in the 17, 20, 22 or 23-position has an alcoholic group, can be etherized with the corresponding alcohol of the formula $(CH_3)_2$—CH—$(CH_2)_{n_3}$—OH or

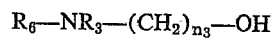

or $(CH_3)_2$—CH—O—$(CH_2)_2$—OH, where $R_3$, $R_6$ and $n_3$ have the previously indicated meanings. This etherization is preferably performed in the presence of a condensation agent such as an alcoholate producer or a dehydrating agent. Instead of the alcohol, a reactive ester of such alcohol can sometimes be used for the etherization. Furthermore, a steroid of Formula I which has a carbonyl or thiocarbonyl group next to an oxygen atom in a side chain can be reduced by treatment with a borane.

The teritary amines of Formula I (where $R_3$ is methyl or ethyl) can be produced from the corresponding secondary amines by introducing the missing radical by the usual alkylating method, if necessary with intermediate blocking of a hydroxyl group in the 3-position of the steroid, or by converting a carbonyl or thiocarbonyl group, in the residue $R_1$ of a steroid of Formula I next to a nitrogen atom into a methylene group by the usual hydrogenation process.

In a steroid which has been produced by one of the methods described above, a functionally modified hydroxyl group in the 3-position can, if desired, be set free, and/or a free or functionally altered hydroxyl group in this position can be converted into an O-acyl group with 1 to 18 carbon atoms by the usual acylation process, or by a conventional chlorination process, can be substituted by a chlorine atom and/or by known alkylating methods can be converted into an O-alkyl group with 1 to 4 carbon atoms. A double bond in the 5,6-position of the steroid thus produced can, if desired, be hydrogenated by known methods, and any of the steroids thus produced can be converted into acid-addition salts.

As a matter of preference, $R_1$ is any of the following:

$$-\underset{\underset{CH_3}{|}}{CH}-N(CH_3)-CH_2-\underset{\underset{CH_3}{|}}{CH}-CH_3 \quad (1)$$

(1) $-CH(CH_3)-N(CH_3)-CH_2-CH(CH_3)_2$ (2) $-CH(CH_3)-N(C_2H_5)-CH_2-CH(CH_3)_2$ (3) $-CH(CH_3)-CH_2-N(CH_3)-CH(CH_3)_2$ (4) $-CH(CH_3)-CH_2-N(C_2H_5)-CH(CH_3)_2$ (5) $-CH(CH_3)-N(CH_3)-(CH_2)_2-CH(CH_3)_2$ (6) $-CH(CH_3)-N(C_2H_5)-(CH_2)_2-CH(CH_3)_2$ (7) $-CH(CH_3)-CH_2-N(CH_3)-CH_2-CH(CH_3)_2$ (8) $-CH(CH_3)-CH_2-N(C_2H_5)-CH_2-CH(CH_3)_2$ (9) $-CH(CH_3)-(CH_2)_2-N(CH_3)-CH(CH_3)_2$

(10) $-CH(CH_3)-(CH_2)_2-N(C_2H_5)-CH(CH_3)_2$

(11) $-CH(CH_3)-(CH_2)_2-N(CH_3)_2$

(12) $-CH(CH_3)-(CH_2)_3-N(CH_3)_2$

(13) $-CH(CH_3)-(CH_2)_2-N(CH_3)(C_2H_5)$

(14) $-CH(CH_3)-(CH_2)_2-N(C_2H_5)_2$

(15) $-CH(CH_3)-O-(CH_2)_2-N(CH_3)_2$

(16) $-CH(CH_3)-N(CH_3)-CH_2-CH(C_2H_5)_2$

(17) $-CH(CH_3)-N(CH_3)-CH_2-CH(CH_3)(C_2H_5)$

(18) $-CH(CH_3)-N(C_2H_5)-CH_2-CH(C_2H_5)_2$

(19) $-CH(CH_3)-N(C_2H_5)-CH_2-CH(CH_3)(C_2H_5)$

(20) $-CH(CH_3)-CH_2-N(CH_3)-CH(C_2H_5)_2$

(21) $-CH(CH_3)-CH_2-N(CH_3)-CH(CH_3)(C_2H_5)$

(22) $-CH(CH_3)-CH_2-N(C_2H_5)-CH(C_2H_5)_2$

(23) $-CH(CH_3)-CH_2-N(C_2H_5)-CH(CH_3)(C_2H_5)$

(24) $-CH(CH_3)-O-(CH_2)_2-CH(CH_3)_2$

(25) $-CH(CH_3)-O-CH_2-CH(CH_3)_2$

(26) $-CH(CH_3)-CH_2-O-CH_2-CH(CH_3)_2$

(27) $-CH(CH_3)-CH_2-O-CH(CH_3)_2$

(28) $-CH(CH_3)-(CH_2)_2-O-CH(CH_3)_2$

(29) $-N(CH_3)-(CH_2)_2-O-CH(CH_3)_2$

(30) $-N(CH_3)-(CH_2)_2-CH(CH_3)_2$

(31) $-N(CH_3)-(CH_2)_3-CH(CH_3)_2$

(32) $-N(CH_3)-(CH_2)_2-CH(C_2H_5)_2$

(33) $-N(CH_3)-(CH_2)_4-CH(CH_3)(C_2H_5)$

(34) $-N(CH_3)-(CH_2)_2-NH-CH(CH_3)_2$

(35) $-N(CH_3)-(CH_2)_2-N(CH_3)-CH(CH_3)_2$

(36) $-N(CH_3)-(CH_2)_2-N(C_2H_5)-CH(CH_3)_2$

(37) $-CH(CH_3)-CH_2-NH-CH(CH_3)_2$

(38) $-CH(CH_3)-(CH_2)_2-NH-CH(CH_3)_2$

(39) $-O-(CH_2)_2-NH-CH(CH_3)_2$

(40) $-CH(CH_3)-NH-CH_2-CH(CH_3)_2$

(41) $-CH(CH_3)-CH_2-NH-CH_2-CH(CH_3)_2$

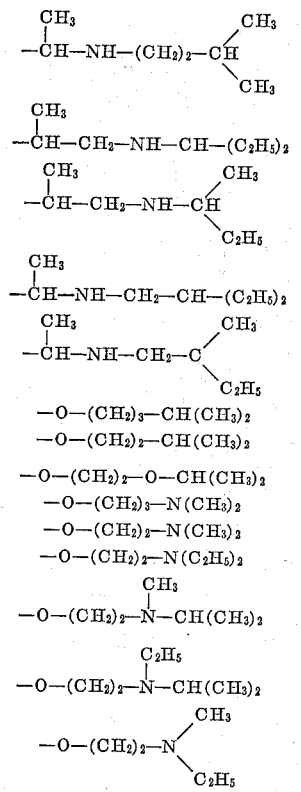

$$-\overset{|}{\text{CH}}-\text{NH}-(\text{CH}_2)_2-\text{CH}\diagup^{\text{CH}_3}_{\diagdown\text{CH}_3} \overset{\text{CH}_3}{\phantom{|}} \quad (42)$$

$$-\overset{\overset{\text{CH}_3}{|}}{\text{CH}}-\text{CH}_2-\text{NH}-\text{CH}-(\text{C}_2\text{H}_5)_2 \quad (43)$$

$$-\overset{\overset{\text{CH}_3}{|}}{\text{CH}}-\text{CH}_2-\text{NH}-\text{CH}\diagup^{\text{CH}_3}_{\diagdown\text{C}_2\text{H}_5} \quad (44)$$

$$-\overset{\overset{\text{CH}_3}{|}}{\text{CH}}-\text{NH}-\text{CH}_2-\text{CH}-(\text{C}_2\text{H}_5)_2 \quad (45)$$

$$-\overset{\overset{\text{CH}_3}{|}}{\text{CH}}-\text{NH}-\text{CH}_2-\text{C}\diagup^{\text{CH}_3}_{\diagdown\text{C}_2\text{H}_5} \quad (46)$$

—O—(CH₂)₃—CH(CH₃)₂ (47)
—O—(CH₂)₂—CH(CH₃)₂ (48)
—O—(CH₂)₂—O—CH(CH₃)₂ (49)
—O—(CH₂)₃—N(CH₃)₂ (50)
—O—(CH₂)₂—N(CH₃)₂ (51)
—O—(CH₂)₂—N(C₂H₅)₂ (52)

$$-\text{O}-(\text{CH}_2)_2-\overset{\overset{\text{CH}_3}{|}}{\text{N}}-\text{CH}(\text{CH}_3)_2 \quad (53)$$

$$-\text{O}-(\text{CH}_2)_2-\overset{\overset{\text{C}_2\text{H}_5}{|}}{\text{N}}-\text{CH}(\text{CH}_3)_2 \quad (54)$$

$$-\text{O}-(\text{CH}_2)_2-\text{N}\diagup^{\text{CH}_3}_{\diagdown\text{C}_2\text{H}_5} \quad (55)$$

With respect to R₁, the cholesterol and cholestanol derivatives of Formula I esterified in the 3-position are preferably the formate, acetate, propionate, n-butyrate, isobutyrate, n-valerate, isovalerate, trimethylacetate, caproate, cyclopentyl carbonate, oenanthate, caprylate, pelargonate, caprate, laurate, myristate, palmitate, stearate, undecylenate, oleate, cyclopentyl acetate, cyclopentyl propionate, cyclohexyl acetate, cyclohexyl propionate, benzoate, substituted benzoates, phenyl acetate, phenyl propionate and nicotinate. On the other hand, compounds of Formula I with a 3-O-alkyl group are preferably the corresponding 3 - methoxy-, 3 - ethoxy-, 3-n-propoxy, 3-isopropoxy-, 3-n-butoxy-, 3-isobutoxy, 3-sec.-butoxy- and 3-tert.-butoxy-cholesterol or cholestanol derivatives. It is also preferred for R to be either chloro or hydroxy.

The preceding preferred specific identities of R₁ and R yield preferred compounds of the present invention, it being noted that any R₁ can be employed with any R, and that a large but finite group of compounds is thus embraced. Consequently, to present a large list of these compounds would be merely redundant.

In any event, the most highly preferred compounds are:

22-oxa-25-aza-cholesterol
20-oxa-21-nor-25-aza-cholesterol
22-aza-cholestane-3β-ol
N-ethyl-22-aza-24-nor-cholesterol
20-oxa-21,24-bis-nor-25-aza-cholesterol
N-ethyl-20-oxa-21,26-bis-nor-24-aza-cholesterol
3β-chloro-22-oxa-25-aza-5-cholestene
20-aza-24-nor-cholesterol
20-aza-24-oxa-cholestane-3β-ol
N-ethyl-20-oxa-21-nor-24-aza-cholesterol
20-aza-24-oxa-cholesterol
22-oxa-25-aza-cholestane-3β-ol
20-oxa-21-nor-25-aza-cholestane-3β-ol
20,24-diaza-cholestane-3β-ol
20-aza-cholestane-3β-ol
24-aza-cholestane-3β-ol
N-ethyl-26-nor-24-aza-cholestane-3β-ol
20-oxa-21-nor-cholestane-3β-ol
20-oxa-21,24-bis-nor-cholestane-3β-ol
22-oxa-cholestane-3β-ol
22-oxa-24-nor-cholestane-3β-ol
23-oxa-cholestane-3β-ol
23-oxa-24-nor-cholestane-3-ol
24-oxa-cholestane-3β-ol
22-aza-24-nor-cholestane-3β-ol
23-aza-24-nor-cholestane-3β-ol
24-nor-25-aza-cholestane-3β-ol As stated previously, the compounds of Formula I can be produced by the hydrogenation of those original steroids which have a carbonyl or thiocarbonyl group in the residue R₁ next to a nitrogen atom. The reduction of such a carbonyl or thiocarbonyl group can be accomplished, e.g. wtih lithium aluminum hydride or with a mixture of boron trifluoride and lithium aluminum hydride. Suitable solvents for this reaction are ethers such as tetrahydrofuran, dioxane, diethylene-glycol-diethyl ether or dibutyl ether, possibly in the presence of dry pyridine to facilitate solution. The hydrogenation can also be performed in the presence of catalysts such as platinum oxide, Raney-nickel, Raney-cobalt or nickel-sulfide/molybdenum-sulfide. In this case, suitable solvents are, e.g. dioxane, alcohol or glacial acetic acid. The carbonyl group can be in blocked form as an imide-chloride group, and in the presence of a palladium or a palladium/barium-carbonate catalyst can likewise be converted into a methylene group. For this reduction, use can be made of practically any of the methods which are described in Houben-Weyl's "Methoden der Organischen Chemie," published by George Thieme, Stuttgart, (1957), vol. XI/I, pages 574–600.

As a starting material for hydrogenation, use can also be made of compounds which instead of a —CH₂—NH— or >CHNH— group, have a —CH=N or >C=N— group. Such Schiff bases can, e.g. by the use of a complex metal hydride such as lithium-aluminum hydride or sodium-boron hydride be converted into secondary amino groups. As a solvent for such hydrogenation, ether, tetrahydrofuran, dioxane or dibutyl ether can be used. The reduction can be performed by the use of an alkali metal or alkali metal amalgam such as, e.g. sodium or sodium amalgam in alcohol, or zinc in the presence of alkali. The hydrogenation can also be performed catalytically in the presence of Raney-nickel, platinum oxide, palladium-black or nickel/kieselguhr as a catalyst, preferably in the presence of a suitable solvent such as methanol, glacial acetic acid, benzene, toluene or decahydronaphthalene. If as a starting material for such a reduction, a steroid of Formula I is selected wherein R is chlorine, then the conditions for hydrogenation must be such that the halogen atoms will not be attacked. When a 3-chlorosteroid is used as the starting material, it is best to avoid acalytic hydrogenation but instead to use complex metal hydrides for hydrogenation. It is generally possible, however, to use any of the hydrogenation methods described in Houben-Weyl's loc. cit. on pages 618 to 631 and 665 to 669.

It is also possible to produce the secondary amines of Formula I by commencing with those steroids which have in the residue R₁ an aryl —CH=N group instead of the isoalkyl-amino group. Such initial steroids can be converted into the desired secondary isoalkyl-amino-steroids by treatment with a corresponding isoalkylhalide, e.g. with isopropyl-, isobutyl-, isoamyl-, sec.-butyl-, α-ethyl-n-propyl-, 2-ethyl-n-butyl- or 2-methyl-n-butyl-bromide, -chloride or -iodide. During this reaction there will first be a formation of the corresponding quaternary ammonium salts which produce on hydrolysis besides the corresponding aldehyde of Formula aryl-CHO, also the desired secondary amine of Formula I. The reaction is advantageously performed in the presence of a suitable solvent, e.g. methanol, ethanol, or in the same alkyl halide that is used as a reaction component. The term "aryl"

is here understood to mean especially a phenyl or tolyl residue (see Houben-Weyl, loc. cit., page 108).

The secondary amines of Formula I can also be obtained by the usual alkylation of the corresponding primary steroids with isoalkylamines, For example, the steroid-amines can be alkylated by reaction with the corresponding halide, e.g. with an isopropyl-, isobutyl, isoamyl-, 1-ethyl-n-propyl-, 1-methyl-n-propyl-, 2-ethyl-n-butyl-, or 2-methyl-n-butyl-halide. Alkylation by the reverse method is also possible, namely by reaction of the corresponding amines with their respective steroid-alkyl-, steroid-oxyalkyl- or steroid-methyl-aminoethyl-halide. Halides suitable for such alkylations are especially the bromides, chlorides and iodides. The primary amine is preferably used in excess and for absorbing the hydrohalide that is formed, a strong base such as sodium or potassium hydroxide, potassium carbonate, certain silver salts, alkali hydride or alkali amide is added. Neutral salts and ammonium salts can also be added as condensation agents, such as lithium bromide or sodium bromide, sodium nitrate, ammonium chloride, calcium nitrate, strontium nitrate or copper salts. It is also advantageous to add sodium iodide or potassium iodide if an isoalkyl bromide or isoalkyl chloride is used as the organic halide. In this case, the respective iodides which react more quickly than the corresponding bromides or chlorides will be formed as intermediaries. As a solvent for such an alkylation, benzene, toluene, petroleum ether, acetone or alcohol can be used. It may also be possible to work without any added solvent. The required reaction temperatures range from $-30°$ C. to $+160°$ C. The conditions can vary widely (see Houben-Weyl, loc. cit., pages 108–112).

The alkylation can also be performed by reacting the corresponding primary steroid- or isoalkylamine with its respective carbonyl compound in the presence of a hydrogenation catalyst. The work is preferably done by dissolving the primary amine and the carbonyl compound in a suitable solvent and then adding the hydrogenation catalyst. Suitable solvents are methanol, ethanol, tetrahydrofuran, dioxane, and benzene. The carbonyl compound can also be added gradually to a mixture of primary amine, hydrogen and hydrogenation catalyst. As hydrogenation catalysts for such a reaction, platinum, platinum oxide, palladium-black, Raney-nickel and nickel/kieselguhr should be given special consideration. As carbonyl compounds corresponding to the respective steroid-amines, consideration should be given to acetone, isobutyraldehyde, isovaleraldehyde, diethyl ketone, methyl-n-propyl ketone, 2-ethyl-n-butyraldehyde and 2-methyl-n-butyraldehyde. The reaction conditions for these special alkylations are described in Houben-Weyl, loc. cit., pages 618–639.

Another special alkylation process for the production of secondary amines of Formula I consists in reacting the corresponding primary amines with reactive esters. In that manner, a primary steroid amine can be reacted with a suitable ester of the corresponding alcohol, namely of the isopropanol, isobutanol, isoamyl alcohol, 2-ethyl-n-propanol, 2-methyl-n-propanol, 2-ethyl-n-butanol or 2-methyl-n-butanol. Suitable esters are those of sulfurous acid, phosphorous, acid, phosphoric acid, alkyl- or aryl-sulfonic acids, sulfuric acid or 2,4-dinitrobenzene-sulfonic acid. In the selection of a solvent, care should be taken to select one in which both components are soluble.

The final products of Formula I can also be produced from those steroids which have in the residue $R_1$ in place of the isoalkylamino group, an N-isoalkyl-N-acyl-amino group where "acyl" denotes the acid residue of a carboxylic or sulfonic acid. The acyl group of such an N-isoalkyl-N-acylamino-steroid can be substituted by hydrogen by the usual hydrolytic or alcoholytic methods. For the hydrolytic splitting of carboxylic acid amides, the hydrolysis can be performed in an acid medium, e.g. with aqueous hydrohalide acid or with dilute or semi-concentrated sulfuric acid. The carboxylic acid amide can also be split by alkalies, e.g. by sodium or potassium hydroxide in aqueous alcoholic solution or in ethylene glycol or ethylene-glycol-monomethylether as solvents, or can be split alcoholytically, e.g. by a solution of a hydrohalide or boron trifluoride in absolute ethanol or methanol at boiling temperature of the alcohol. The splitting of sulfonic acid amides can be similarly done in an acid or alkaline medium. Sulfonic acid amides can also be split effectively with zinc and acid, with sodium in liquid ammonia, or with sodium alcoholates. The liberation of the secondary amine from acyl-amines can moreover occur under all reaction conditions as described in Houben-Weyl, loc. cit., pages 98–100 and 926–948.

The cholesterol derivatives of Formula I which contain oxygen or oxygen and nitrogen in the 17-side-chain instead of carbon atoms can be produced by known methods. In each case, the synthesis is commenced either with two alcohols or with one alcohol and a reactive ester of the other alcohol. In that manner, the steroid-17-alcohols can be reacted with their respective isoalkyl- or isoalkoxyalkyl- or alkylaminoalkyl-alcohols. Steroid-20-alcohols can be reacted with their respective isoalkyl- or dialkyl-aminoalkyl-alcohols, steroid-22-alcohols with secondary butanol or isopropanol, and steroid-23-alcohols with isopropanol.

In these reactions, one of the alcoholic reaction partners can be substituted by a reactive ester thereof, e.g. a halide such as chloride, bromide or iodide, or a sulfuric or sulfonic acid ester such as methane sulfonate or p-toluene sulfonate.

The etherification is preferably performed in the presence of a condensing agent. Suitable condensation agents are, e.g. alkali hydroxide, alcoholate producers such as alkali metals, alkali hydrides, alkali amides or metal-organic compounds such as lithium-methyl. Suitable condensation agents also include halide-ion acceptors such as lead salts or certain silver compounds, e.g. silver oxide, silver carbonate, silver acetate, silver nitrate, silver perchlorate or silver fluoroborate. If the work is commenced with two alcohols, the condensation agent is in the form of a dehydrating agent such as aluminum oxide, sulfuric acid or one of its acid salts, boric acid, or organic sulfonic acids such as p-toluene sulfonic acid. It is advantageous to perform the reaction in the presence of an organic solvent. Suitable solvents are hydrocarbons such as cyclohexane, benzene, toluene or xylene, ethers such as tetrahydrofuran and dioxane, also acetonitrile, acetone, nitromethane, and also liquid ammonia. If the work is done under dehydrating conditions, then suitable solvents are those which would permit the water that is formed during the reaction to be removed by azeotropic distillation, for which benzene and toluene are well adapted. The alcoholate formation can also occur in liquid ammonia. The latter can then be removed and the reaction then performed in the presence of one of the above-mentioned solvents with a higher boiling point.

If a steroid alcohol is used as one of the reaction components for etherification, then care should be taken that a Walden inversion occurs at the steroid-C-atom which carries the reactive group, e.g. a halogen atom or a p-toluene-sulfonic acid residue. For the production of 20-oxa-compounds, the work is commenced with $17\beta$-hydroxy steriods if a free steroid alcohol is to be reacted with a reactive ester of another corresponding alcohol. If, on the other hand, a reactive ester of the steroid alcohol is used, then the work is commenced with the corresponding $17\alpha$-steroid. Similarly for the production of 22-oxa-compounds, use is made of $20\alpha_F$-hydroxy-steroids, and also $20\beta_F$-halogen-steroids and $20\beta_F$-hydroxy-steriod sulfonic acid esters.

The etherification step can be performed by practically all the methods described in Houben-Weyl, loc. cit., vol. 3, pages 132–169.

According to this invention, the new compounds can also be produced by commencing with steroids corresponding the Formula I, but which have a carbonyl or thiocarbonyl group next to an oxygen atom in the side chain. Such steroid esters can be reduced to the desired end products by treatment with a borane, preferably diborane. The borane is generally produced in the reaction solution itself, in which, e.g. a mixture of boron trifluoride with lithium-aluminum hydride or sodium-boron hydride is used as the reducing agent. It is, however, possible to conduct the borane into the reaction solution which preferably contains some additional boron trifluoride. The reaction is preferably performed in the presence of a solvent, e.g. an ether such as diethylether, tetrahydrofuran, dioxane or dithylene-glycol-dimethyl-ether. The required reaction temperatures lie between —30° C. and +150° C. A hydroxyl group, for instance, in the 3-position does not need to be protected in this reaction. Obviously, however, the work can also be commenced with the corresponding i-steroids or steroids with an acetal group in the 3-position, e.g. a tetrahydro-pyranyl-ether.

All tertiary amines of Formula I can be produced from the respective secondary amines by introducing the missing residue by the usual alkylation method, and if necessary with a preliminary blocking of a hydroxyl group in the 3-position of the residue. For example, a secondary steroid-amine can be reacted in that manner with an alkyl halide which may carry substituents. Suitable for substitution in the 17-side-chain of the selected initial steroid, the respective halides are used for arriving at the desired end-product of Formula I. For this purpose, use can be made, for example, of isopropyl halide, isobutyl halide, isoamyl halide, isohexyl halide, 2-(N-methyl-N-isopropylamino)-ethyl-halide, 2-(N - ethyl - N - isopropylamino)-ethyl halide, 2-(isopropoxy)-ethyl - halide, 2 - ethyl - n-butyl-halide, 2-methyl-n-butyl-halide, 1-ethyl-n-propyl-halide, sec,-butyl halide, or 3-ethyl or 3-methyl-n-phenyl-halide. Substituted secondary 20-, 22-, 23-, 24- and 25-azasteroid corresponding to Formula I can be methylated, while corresponding secondary 22-, 23- and 24-azasteroids can be ethylated.

For the production of the tertiary steroidamines-amines of Formula I, it is also possible to proceed alternatively from the corresponding secondary aliphatic amines and to alkylate these with the respective steroid-halides. The selection of the amine is determined by the substituents already present in the 17-side-chain of the steroid-halide. Amines that would be particularly suitable for producing the various possible side-chains in Formula I are dimethyl amine, diethyl amine, N-isopropyl-N-methyl-amine N-isopropyl-N-ethyl-amine, N-methyl-N-ethyl-amine, N-methyl-N-isobutyl-amine, N-ethyl-N-isobutyl-amine, N-methyl-N-isoamyl-amine, N-ethyl-N-isoamyl-amine, N-methyl-N-isohexyl-amine, N-methyl - N - ($\beta$ - isopropylamino)-ethyl amine, N-methyl-N-$\beta$-(N'-methyl-N'-isopropylamino)-ethyl amine, N-methyl-N-$\beta$-(N'-ethyl-N'-isopropylamino)-ethyl amine, N-methyl-N-$\beta$-(isopropoxyethyl)-amine, N-methyl-N-($\gamma$-ethyl-n-pentyl)-amine, N-methyl-N-($\gamma$-methyl-n-pentyl)-amine, N-methyl- or N-ethyl-N-($\beta$-ethyl-n-butyl)-amine, N-methyl- or N-ethyl-N-($\beta$-methyl-n-butyl)-amine, N-methyl- or N-ethyl-N-($\alpha$-ethyl-n-propyl)amine, N-methyl- or N-ethyl-N-sec.-butyl amine.

For alkylations of this kind, the bromides, chlorides and iodides are generally used as the organic halides.

The secondary amine is generally used in excess. For capturing the hydrogen halide that is liberated, a strong base such as sodium or potassium hydroxide, potassium carbonate, certain silver salts, alkali hydrides or alkali amides can be added. As condensation agents neutral salts and ammonium salts are suitable, such as lithium bromide, sodium bromide, sodium nitrate, ammonium chloride, calcium nitrate, strontium nitrate or copper salts. If a bromide or chloride has been introduced, the reaction can be accelerated by the addition of sodium iodide or potassium iodide. As solvents, use can be made, e.g. of benzene, toluene, petroleum ether, acetone or alcohol. In some cases the work can be done without solvents. The required reaction temperatures lie between about —30° C. and +160° C.

If a reactive ester, e.g. a halide or a p-toluene-sulfonic-acid ester of a steroid alcohol is used for the alkylation, then care should be taken that a Walden inversion will occur at the steroid-C-atom which carries the reactive group. For the production of 20-aza-compounds, the work is therefore commenced with the reactive esters of the respective 17$\alpha$-hydroxy-steroids.

The alkylation can also be performed by reacting a corresponding secondary steroid or isoalkylamine with a respective carbonyl compound in the presence of a hydrogenation catalyst. The work is preferably done in such a manner that the secondary amine and the carbonyl compound are dissolved in a suitable solvent and the hydrogenation catalyst is then added. Suitable solvents for this reaction are especially the lower aliphatic alcohols such as methanol and ethanol. Suitable carbonyl compounds are, according to the initial steroids, acetone, isobutyraldehyde, isoamylaldehyde, $\alpha$-methyl or $\alpha$-ethyl-n-butyraldehyde, $\beta$-methyl- or $\beta$-ethyl-n-valeraldehyde, methyl-ethylketone or diethylketone. This method of alkylation can be performed with all the variations previously described where at any time, instead of the halide, the corresponding carbonyl compound can be used.

Another alkylation process for the production of the desired tertiary amines comprises the reaction of the corresponding secondary steroid—or isoalkylamine with reactive esters other than the halides, namely with esters of sulfurous acid, phosphorous acid, orthophosphoric acid, alkyl- or aryl-sulfonic acid, sulfuric acid, or also the 2,4-dinitrobenzene-sulfonic acid.

For the production of the tertiary amines of Formula I, it is generally possible to use any of the alkylation methods that are described in Houben-Weyl, loc. cit., pages 108–112 and 618–639.

The initial steroids can have in their 3-position either a chlorine atom or a free or functionally modified hydroxyl group. The hydroxyl group can, for example, be in the form of an ester group or as a readily separable ether group (like an acetal group), e.g. a tetrahydride-pyranyl-ether or an $\alpha$-ethoxyethyl-ether group. If the initial steroid has a 5,6-double bond, then this, together with a 3-hydroxyl group, can exist as an i-steroid grouping. As a starting material, a 3$\alpha$,5$\alpha$-cyclo-6-ol-steroid can therefore be used, in which the hydroxyl group in the 6-position can be likewise esterified or etherized.

In a steroid that has been produced according to this invention, and which has in the 3-position a functionally altered hydroxyl group, the latter can be set free in the usual manner, e.g. by hydrolysis which with an ester group can be either alkaline or acid, but with an ether group or an i-steroid group, is generally only acid. For alkaline hydrolysis, alkali hydroxides are especially suitable. For acid hydrolysis, alcoholic or aqueous-alcoholic mineral acids can be used.

A hydroxyl group in the 3-position of the synthesized steroid which has been liberated or functionally altered can be converted by known acylation methods into an O-acyl group with 1 to 18 carbon atoms. As steroids with functionally altered 3-hydroxyl groups which are to be esterified, consideration should be given especially to i-steroids or 3-hydroxy-steroid-sulfonic-acid esters. With the secondary amines of Formula I, the esterification is preferably performed under mild conditions, so that the secondary amino group of the side-chain will not also be acylated. For the esterification, the halides and anhydrides of the acids here named, or the acids themselves, are particularly suitable: formic, acetic, propionic, n-butyric, isobutyric n-valeric, iso-valeric, trimethylacetic, caproic, cyclopentylcarboxylic, oenanthic, caprylic, pelargonic, capric, lauric, myristic, palmitic, stearic, undecylenic, oleic, cyclopentyl-acetic, cyclopentylpropionic, cyclohexylacetic, cyclohexylpropionic, benzoic, substituted benzoic, phenyl-acetic, phenyl-propionic and nicotinic acid.

A hydroxy group which is present or has been set free in the 3-position of a synthesized steroid can be converted by the usual acylation methods into an O-alkyl group with 1 to 4 carbon atoms. Such etherification or alkylation is accomplished by the usual methods. As suitable etherifying agents, methyl-, ethyl-, n-propyl-, iso-propyl-, n-butyl-, sec.-butyl-, iso-butyl- or tert.-butyl-bromide, -chloride or -iodide are preferred. For the etherification, a corresponding alkanol with 1 to 4 carbon atoms can also be used by condensing it with the appropriate 3-chloro-steroid, or under dehydrating conditions with the corresponding 3-hydroxy-steroid. Instead of a 3-hydroxy-steroid, a steroid with a functionally altered 3-hydroxy group can also be used. For example, a 3-hydroxy-steroid-sulfonic-acid-ester or an i-steroid; hence a 3α,5α-cyclo-6-ol-steroid or a 3α,5α cyclo-6-alkoxy-steroid can be used. As a solvent, use can be made of the alcoholic reaction component itself. Sometimes it is also advantageous to use a condensing agent such as an alcoholate former, or a catalyst such as p-toluene-sulfonic acid.

In the synthetically produced steroid of Formula I, a free or functionally altered hydroxyl group can also be substituted by a chlorine atom by the usual chlorination methods. For such chlorination, use can be made of hydrochloric acid, thionyl chloride, or phosphorus pentachloride. The 3-hydroxy-steroids can also be converted into the chloroformates and the latter then decomposed thermally into the 3-chloro-steroids. In another method for the production of the 3-chloro-steroids, the corresponding i-steroids, that is the i-steroid-6-ethers, can be employed as starting materials by reacting them with hydrochloric acid or acetyl chloride. Also, from the steroid-3-ethers of the steroid-3-sulfonic acid esters, the respective steroid-3-chlorine compounds can be obtained by treatment with hydrochloric acid or a chloride. The reaction is preferably performed in the presence of a suitable solvent such as benzene, dioxane or pyridine.

If a steroid of this invention contains a double bond in the 5,6-position, the latter can be hydrogenated by the usual methods, preferably in the presence of noble metal catalysts such as finely divided palladium or platinum oxide. For use as solvents, the lower carboxylic acids such as acetic acid, or esters such as methyl or ethyl acetate are suitable.

Those end-products of this invention which in the side-chain contain a nitrogen atom can be converted into acid-addition salts by treatment with an acid in the usual manner. For this conversion, use should be made of those acids whose salts are not physiologically dangerous. They can be either organic or inorganic acids, such as aliphatic, alicyclic, araliphatic, aromatic or heterocyclic mono- or polyvalent carboxylic or sulfonic acids, e.g. formic, acetic, propionic, diethylacetic, oxalic, malonic, succinic, pimelinic, fumaric, maleic, lactic, aminocarboxylic, sulfaminic, benzoic, phenylpropionic, citric, ascorbic, isonicotinic, sulfuric, hydrohalide such as hydrochloric or hydrobromic, or phosphorus-containing such as orthophosphoric acid.

The 17β-steroid-alcohols which are required as starting materials can be obtained from the corresponding 17-keto-steroids by catalytic hydrogenation with Raney-nickel in alcoholic solution or by reduction with complex metal hydrides, while the 20α$_F$-steroid-alcohols can be obtained from the 20-keto-steroids by reduction with sodium in alcohol or by catalytic hydrogenation with Raney-nickel in alcoholic solution, whereby the separation of the 20β$_F$-isomers is accomplished by chromatography and/or crystallization. The 22-steroid-alcohols can be obtained from Δ$^{22}$-sterols, as e.g. stigmasterol, by the action of ozone and subsequent reduction, wherein the 5-double-bond is protected, if necessary by the addition of a halogen or hydrohalide to form an intermediate. The 23-steroid-alcohols can be obtained, e.g. from the 22-acids by chain-lengthening according to Arndt-Eistert method with subsequent reduction.

The reactive esters of the steroid alcohols are preferably produced from the alcohols themselves, during which a Walden inversion occurs with hydrohalide acids, so that 17β-hydroxy-steroids give 17α-halogen-steroids and 20α$_F$-hydroxy-steroids give 20β$_F$-halogen steroids. In the case of sulfur-containing esters it is necessary to begin with the 17α-hydroxy- or 20β$_F$-hydroxy-steroids, which can be obtained by hydrolysis of the sulfonic acid esters of their epimers. The 20β$_F$-steroid-alcohols can also be obtained from the corresponding 20-keto-steroids by reduction with complex metal hydrides.

The production of secondary 20-aza-cholesterol-or -nor-cholesterol-derivatives for use as a starting material can be accomplished by condensation of a corresponding primary amine with a 17-keto-steroid and reduction of the resulting Schiff base with a complex metal hydride to 20-aza-21-nor-cholesterol derivatives (J. Med. Pharmaceut. Chem., vol. 5 (1962), page 1224). It is also possible to commence with a 17β-methylamino-steroid (produced from a 17-keto-steroid with methylamine and subsequent reduction of the 17(20)-double-bond by a process similar to that of the Belgian Patent 586,621), which is converted into the acid-amide by chloro-acetamide, is then alkylated, and is reduced by a complex metal hydride whereby substituted 17β-methyl-amino-steroids are obtained.

The secondary 23-aza-steroids of the cholesterol and nor-cholesterol series which are used as starting materials are obtained by alkylation of the corresponding bis-nor-cholenic-acid-chlorides (Med. u. Chem., vol. 4 (1942), 327; cited from Zentralblatt, vol. 1943, 2689, and Chemical Abstracts, 1944, 4954) with the required primary amines and reduction of the resulting acid amines with a complex metal hydride.

Starting compounds with a secondary nitrogen atom in position 24 of the cholesterol or nor-cholesterol side-chain can be produced by reaction of 20-keto-compounds with cyano-acetic ester (J. Chem. Soc., 1952, p. 161), followed by partial hydrogenation of the 20(22)-double-bond (see Helv. Chim. Acta, 1962, page 1939), saponification and decarboxylation and reduction of the cyano group to a primary amino group. The latter can then be converted into the corresponding secondary amine by known alkylation methods, or the cyano group can be converted into the acid amide by treatment with hydrogen peroxide, and is then mono-alkylated and converted into the corresponding secondary amine by treatment with lithium-aluminum-hydride.

For the production of such starting materials of the cholesterol or nor-cholesterol series which have a secondary nitrogen atom in position 22, the work is advantageously commenced with 20α-amino-pregnane derivatives (J. Am. Chem. Soc., 1948, page 888 and 1960, page 5688), which are converted into the corresponding acyl compounds and are then reduced by lithium-aluminum-hydride to the secondary amines.

The starting compounds with the side-chains

—O—(CH$_2$)$_2$—NH—CH$_3$
—O—(CH$_2$)$_2$—NH—C$_2$H$_5$
—CH(CH$_3$)—O—(CH$_2$)$_2$—NH$_2$
—O—(CH$_2$)$_2$—NH$_2$
—O—(CH$_2$)—NH—CH(CH$_3$)$_2$ and

—O—(CH$_2$)$_3$—NH$_2$ can be produced as follows: The work is commenced with 5-androstene-3β-ol-17-one or 5-pregnene-3β-ol-20-one or derivatives thereof which are saturated in the 5,6-position. The 3β-hydroxyl group is protected by the formation of the tetrahydro-pyranyl-ether or α-ethoxy-ethyl-ether. The keto group in the 17- or 20- position is then converted into a hydroxyl group by a complex metal hydride, an alkali metal in alcohol, or by hydrogen in alcoholic solvents in the presence of Raney-nickel. The 17- or 20-alcohols thus obtained, which are protected in the 3-position, are converted by the required ω-halogen-carboxylic acid ester into compounds with a side-chain —O—(CH$_2$)$_n$.COOR (where $n=1$ or 2 and R is a hydrocarbon radical), which are then converted by the required primary amine into acid amines with a side-chain —O—(CH$_2$)$_n$—CO—NH—R (wherein R=H, CH$_3$, C$_2$H$_5$ or CH(CH$_3$)$_2$ and $n=1$ or 2). These are then reduced to secondary amines by lithium-aluminum hydride.

The steroid-amines or thio-amines which are required as starting materials can be produced by reacting the respective steroid esters with the corresponding aliphatic amines. The steroid-thioamides can also be obtained by coupling the corresponding metal-organic compounds to their respective isothiocyan-acid-esters. The Schiff bases which can also be used as starting materials are obtainable from the parent steroid-keto-compounds and the respective aliphatic amines. Comounds of Formula I in which R$_1$ contains an aryl-CH=N— group instead of the isoalkylamino group can be obtained by reacting the corresponding primary steroid-amines with an aromatic aldehyde, e.g. benzaldehyde. The primary steroid-amines which are used for the alkylation reactions can be obtained by reduction of the corresponding steroid-oximes, nitriles or mono-substituted steroid-carboxylic acidamides. Starting materials of Formula I in which R$_1$ has an N-acyl-isoalkylamino group can be produced by alkylation of the parent N-acylamino compounds.

From the foregoing discussion, it is evident that a large number of novel and unobvious starting materials and intermediates are covered by this invention.

These new compounds are valuable therapeutic agents, and can be employed in admixture with the usual pharmaceutical carriers. As carriers, there can be used those organic and inorganic substances which are suitable for parenteral or enteral application and which do not react with the new compounds, as for example, water, vegetable oils, polyethylene glycol, gelatin, lactose, starch, magnesium stearate, talcum, etc. For enteral application tablets, dragees or solutions can be used which can be sterilized if necessary or mixed with ancillary materials such as preservatives, stabilizers or wetting agents, or with salts for influencing the osmotic pressure, or with buffer substances.

The new compounds are preferably used in oral dosage units of 2 to 300 mg., but it is also possible to administer them parenterally when necessary.

The investigations to evaluate the activity of the new compounds were conducted according to the test method as described in Journal med. pharm. Chem., vol. 5, page 1224, 1962.

The substances to be tested were administered ten times to normally fed rats. The animals were sacrificed after 10 days and the cholesterol level in the blood serum was determined.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

*22-aza-cholesterol*

7 g. 20-isoamyl-imino-5-pregnene-3β-ol are dissolved in 75 ml. of anhydrous tetrahydrofuran and are added slowly to a suspension of 5 g. sodium borohydride in 200 ml. of anhydrous ether. The mixture is refluxed for 90 minutes. The excess of hydride is destroyed by addition of aqueous methanol. Sodium potassium tartrate is added to the reaction mixture which then is thoroughly shaken. The ethereal layer is separated and the aqueous layer is extracted with ether. The combined extracts are washed and dried over sodium sulfate. The amine is precipitated by addition of gaseous HCl and filtered off. The precipitate is dissolved in methanol. The thus obtained solution is made strongly alkaline by addition of 1 N-sodium hydroxide and poured into 1 liter water. The precipitated 22-aza-cholesterol is recrystallized from methanol. M.P. 133–139° C., $[\alpha]_D^{23}$ —20° (chloroform).

In analogy the following compounds may be prepared:

22-aza-24 - ethyl-27 - norcholesterol from 20-(2'-ethyl)-butylimino-5-pregnene-3β-ol, and
22-aza-24-methyl-27-norcholesterol from 20β-(2'-methyl)-butylimino-5-pregnene-3β-ol.

EXAMPLE 2

*23-aza-cholesterol*

2 g. 3β-hydroxybisnor-cholenic-acid-isobutylamide are dissolved in 70 ml. anhydrous dioxane and added to a suspension of 1.0 g. lithium aluminum hydride in 35 ml. anhydrous dioxane. The mixture is refluxed for 18 hours, then the excess of the hydride is destroyed by addition of aqueous dioxane. The solution is heated with 0.8 ml. of 20% sodium hydroxide. After addition of some water, the precipitated salts are filtered off in the hot and washed with dioxane. The crude 23-aza-cholesterol is isolated from the organic layer, dissolved in methanol and precipitated with ethereal hydrogen chloride. The free base may be obtained by addition of 1 N-sodium hydroxide until a strongly alkaline reaction and subsequent addition of water. In analogy the following compounds may be obtained.

23-aza-24-ethyl-27-nor-cholesterine from 3β-hydroxy-bis-norcholenic-acid-1'-ethyl propylamide;
23-aza-24-methyl-27-norcholesterine from 3β-hydroxy-bis-norcholenic-acid-1'-methyl propylamide.

EXAMPLE 3

*24-aza-cholesterol*

A solution of 3 g. 3β-hydroxy-nor-cholenic-acid-isopropylamide in 100 ml. anhydrous dioxane is added slowly to a suspension of 1.5 g. LiAlH$_4$ in 50 ml. of anhydrous dioxane. The mixture is refluxed for 18 hours. The excess of the hydride is destroyed by addition of aqueous dioxane. Then it is heated to the boiling point with 1.2 ml. of 20% sodium hydroxide. After addition of a small amount of water, the precipitate is filtered off in the hot and washed with dioxane. The combined filtrates are evaporated to dryness. The residue of 24-aza-cholesterol is recrystallized from acetone.

EXAMPLE 4

*22-aza-24-norcholesterol*

9.3 g. of the benzylidene derivative of 20α-amino-5-pregnene-3β-ol are refluxed for 4 hours with 5 ml. isobutylbromide in 150 ml. anhydrous ethanol. After addition of 15 ml. 5 N-hydrochloric acid the solution is refluxed for another 15 minutes and then concentrated to about 50 ml. Upon addition of 50 ml. water it is extracted with ether and the organic layer is separated.

The aqueous suspension is treated with 2 N-sodium hydroxide until an alkaline reaction. The mixture is allowed to stand overnight, then the 22-aza-24-norcholesterol is filtered off and recrystallized from methanol. M.P. 130–131° C.; $[\alpha]_D^{22}$ —41° (dioxane).

EXAMPLE 5

*23-aza-24-norcholesterol*

A suspension of 3.1 g. 23 - aza-24 - norcholesterol-N-acetate in 130 ml. anhydrous methanol which contains 1.15 g. HCl is refluxed for four hours. The solvent is evaporated and the residue is dissolved in methanol. The

EXAMPLE 6

*20,24-diazacholesterol*

A solution of 3 g. 17-[N-methyl-N($\beta$-chloroethyl)]amino-5-androstene-3$\beta$-ol in 150 ml. ethanol is treated with a fivefold excess of isopropylamine for 16 hours in a bomb tube to 100° C. The reaction mixture is concentrated and extracted with ether upon addition of water. The extract is washed with water and dried over sodiumsulfate. The solvent is evaporated and the residue chromatographed through silica gel. The 20,24-diazacholesterol is eluated with chloroform and recrystallized from methanol.

EXAMPLE 7

*20-oxa-21-nor-24-aza-cholesterol*

5 g. 5 - androstene-3$\beta$ - 17$\beta$-diol-3-tetrahydropyranylether-17 - [$\beta$ - (para-toluene-sulfonyloxy)-ethylether] are dissolved in 50 ml. dioxane and heated in a bomb tube for five hours to 100° C. with 10 ml. isopropylamine. Upon cooling, the mixture is diluted with 500 ml. water and extracted with chloroform. The chloroform solution is dried and concentrated. The crude 20-oxa-21-nor-24-aza-cholesterol-3-tetrahydropyranylether is dissolved in 100 ml. ethanol and then refluxed for three hours with 5 ml. concentrated hydrochloric acid. The solution is cooled and filtered through a basic ion exchanger. The eluate is evaporated whereby the 20-oxa-21-nor-24-aza-cholesterol is obtained.

EXAMPLE 8

*3$\beta$-chloro-20-oxa-21-nor-24-aza-5-cholestene*

5 g. 20-oxa-21-nor-24-aza-cholesterol-24-N-acetate are heated in a bomb tube for 24 hours to 170° C. with 100 ml. concentrated HCl. The suspension is made alkaline with sodium hydroxide and extracted with chloroform. The crude 3$\beta$-chloro-20-oxa-21-nor-24-aza-5-cholestene is purified by chromatography over neutral $Al_2O_3$.

In analogy, 3$\beta$ - chloro-20-oxa-21-nor-24-aza-5-cholestane is obtained.

EXAMPLE 9

*3$\beta$-chloro-22-aza-5-cholestene*

1.5 g. of dry $CaCO_3$ and subsequently 30 ml. thionyl chloride are added at 15° C. to a solution of 1.5 g. 22-aza-cholesterol in 60 ml. anhydrous ether. The solution is allowed to stand for four hours at room temperature. The solvent is evaporated under reduced pressure and the residue is chromatographed over basic $Al_2O_3$, whereby 3$\beta$-chloro-22-aza-5-cholestene is obtained.

In analogy the following compounds may be prepared:

3-chloro-23-aza-5-cholestene
3-chloro-24-aza-5-cholestene
3-chloro-22-aza-24-nor-5-cholestene
3-chloro-22-aza-24-ethyl-27-nor-5-cholestene
3-chloro-22-aza-24-methyl-27-nor-5-cholestene
3-chloro-23-aza-24-nor-5-cholestene
3-chloro-23-aza-24-ethyl-27-nor-5-cholestene
3-chloro-23-aza-24-methyl-27-nor-5-cholestene
3-chloro-22,24-diaza-5-cholestene

EXAMPLE 10

*22-aza-cholestane-3$\beta$-ol*

2.5 g. 22-aza-cholesterol are dissolved in 50 ml. methyl acetate and hydrogenated at room temperature in the presence of 250 mg. $PtO_2$. After addition of the calculated amount of hydrogen the catalyst is filtered off and the filtrate is evaporated to dryness. The 22-aza-cholestanol is rescrystallized from acetone. M.P. 144–145° C., $[\alpha]_D^{22}$ +20° (chloroform).

In analogy the following compounds are prepared:

23-aza-cholestanol
24-aza-cholestanol
22-aza-24-norcholestanol
22-aza-24-ethyl-27-norcholestanol
22-aza-24-methyl-27-norcholestanol
23-aza-24-norcholestanol
23-aza-24-ethyl-27-norcholestanol
23-aza-24-methyl-27-norcholestanol
20,24-diaza-cholestanol
3-chloro-22-aza-cholestane
3-chloro-23-aza-cholestane
3-chloro-24-aza-cholestane
3-chloro-22-aza-24-norcholestane
3-chloro-23-aza-24-norcholestane
3-chloro-20,24-diaza-cholestane
3-chloro-22-aza-24-ethyl-27-norcholestane
3-chloro-22-aza-24-methyl-27-norcholestane
3-chloro-23-aza-24-ethyl-27-norcholestane
3-chloro-23-aza-24-methyl2-7-norcholestane

EXAMPLE 11

*22-aza-cholesterol-3-acetate*

3 g. 20-isoamylimino-5-pregnene-3$\beta$-ol-acetate are dissolved in 50 ml. anhydrous tetrahydrofuran and dropped slowly to the suspension of 2.2 g. sodium borohydride in 90 ml. anhydrous ether. After having refluxed the mixture for 90 minutes, the excess of hydride is destroyed by addition of aqueous methanol. The reaction mixture is treated with potassium sodium tartrate and extracted with ether. From the washed and dried ether extracts the 22-aza-cholesterol-3-acetate is obtained.

In analogy the 22-aza-cholesterol-3-propionate and the esters of 23-aza-cholesterol, 24-aza-cholesterol, 22-aza-24-nor-cholesterol, 23-aza-24-nor-cholesterol, 20-oxa-21-nor-24-aza-cholesterol and the corresponding cholestane-3$\beta$-ol derivatives are prepared.

EXAMPLE 12

*22-aza-cholesterol-3-propylether*

In analogy to Example 11, 2.8 g. 20-isoamylimino-5-pregnene-3$\beta$-ol-propyl ether are reacted with 2 g. sodium borohydride. The 22-aza-cholesterol-3-propylether is obtained from aqueous acetone.

EXAMPLE 13

*20-oxa-21-nor-25-aza-cholesterol and its hydrochloride*

5 g. 5-androstene-3$\beta$,17$\beta$-diol-3-tetrahydropyranylether are dissolved in 180 ml. anhydrous xylene and treated with 12.2 g. of a 20% suspension of sodium borohydride in paraffin oil, which is diluted with 150 ml. anhydrous xylene. The mixture is refluxed for 90 minutes under nitrogen. Upon cooling, 12.5 g. $\gamma$-bromopropyl dimethylammonium bromide are added slowly with stirring. Then the reaction mixture is refluxed for 150 minutes, cooled and poured into 500 ml. ice water and extracted with chloroform. The extract is washed with water, dried and evaporated and chromatographed over 150 g. basic $Al_2O_3$. The 20 - oxa-21-nor-25-aza-cholesterol-3-tetrahydropyranylether is eluated with benzene and recrystallized from acetone. M.P. 66–71° C.; $[\alpha]_D^{24}$ −38° (chloroform).

5 g. 20 - oxa - 21 - nor-25-aza-cholesterol-3-tetrahydropyranylether are refluxed with 100 ml. 5% aqueous alcoholic HCl. The mixture is cooled, poured into 500 ml. water and extracted with 250 ml. chloroform. The extract is washed with water and the latter one combined with the aqueous layer. The chloroform extract is evaporated. The 20-oxa-21-nor-25-aza-cholesterol-hydrochloride is recrystallized from methanol/acetone. M.P. 275–282° C. (decomposition).

The aqueous layers are made alkaline with $NaHCO_3$ and extracted once more with chloroform to obtain 20-oxa-21-nor-25-aza-cholesterol. M.P. 149–150° C.; $[\alpha]_D^{24}$ −48° (chloroform).

The free base may also be obtained from the hydrochloride when it is filtered over a strongly basic ion exchanger in methanol.

EXAMPLE 14

*22-oxa-25-aza-cholesterol*

Small particles of potassium are added to 30 ml. liquid ammonia until the blue color does no longer disappear. Then a trace of ferric nitrate and another 500 mg. potassium are added and the solution is stirred for 30 minutes at −70° C. After addition of 5 g. 5-pregnene-3β,20α$_F$-diol-3-tetrahydropyranylether the solution is stirred for another 30 minutes. The ammonia is evaporated by introducing nitrogen and the residue is dissolved in 15 ml. anhydrous dioxane and treated with a solution of 1.8 g. β-chloro-ethyldimethylamine in 5 ml. anhydrous dioxane. The mixture is refluxed under nitrogen for 10 hours diluted with 30 ml. dioxane and evaporated to dryness. After having filtered off the formed KCl the crude product is chromatographed over 150 g. basic $Al_2O_3$. The 22-oxa-25-aza-cholesterol-3-tetrahydropyranylether is eluated with benzene. M.P. 102–104° C. (acetone).

1.36 g. 22-oxa-25-aza-cholesterol-3-tetrahydropyranylether are refluxed for 3 hours with 27 ml. 5% aqueous alcoholic HCl (prepared by diluting concentrated hydrochloric acid with ethanol). After cooling, the solution is poured into 100 ml. ice water, made alkaline with 150 ml. 7% aqueous $NaHCO_3$ and extracted 3 times with 150 ml. chloroform. The combined extracts are washed with water, dried, filtered, and evaporated to dryness. The crude 22-oxa-25-aza-cholesterol is recrystallized from acetone. M.P. 157–160° C. (155° sintering); $[\alpha]_D^{24}$ −30° (chloroform).

In analogy, 22-oxa-25-aza-cholestane-3β-ol is obtained from 5α-pregnane-3β,20α$_F$-diol-3-tetrahydropyranylether. The intermediate 22-oxa-25-aza-cholestane-3β-ol-3-tetrahydropyranylether melts at 83–85° (acetone); $[\alpha]_D^{20}$ +160° (chloroform).

EXAMPLE 15

*20-oxa-21,24-bisnor-25-aza-cholesterol*

A solution of 10 ml. boron trifluoride etherate and 800 mg. 5-androstene-3β,17β-diol-17-dimethylamino acetate in 25 ml. tetrahydrofuran are added slowly under nitrogen to an ice cooled suspension of 400 mg. $LiAlH_4$ in 25 ml. tetrahydrofuran. The mixture is stirred for one hour with ice cooling and then refluxed for one hour. After cooling the ethyl acetate and 50 ml. 2 N HCl are added. The solution is made alkaline with $NaHCO_3$ and extracted with chloroform. The obtained 20-oxa-21,24-bisnor-25-aza-cholesterol is purified by chromatography over basic $Al_2O_3$. M.P. 158–161° C. (acetone); $[\alpha]_D^{24}$ −52° (chloroform).

EXAMPLE 16

*20-aza-24-oxa-cholesterol-3-acetate*

3.9 g. 17β[(N-methyl-N-β-hydroxyethyl)-amino]-5-androstene-3β-ol-3-acetate, 0.75 g. isopropanol, 2.66 g. para-toluene-sulfonic-acid-monohydrate and 150 ml. anhydrous toluene are refluxed in an apparatus with water separator. After three hours, 0.45 ml. water have separated. The solution is allowed to cool, washed with aqueous $NaHCO_3$ and water, dried with sodium sulfate and evaporated. The obtained 20-aza-24-oxa-cholesterol-3-acetate is purified by chromatography over basic $Al_2O_3$.

EXAMPLE 17

*22-oxa-25-aza-cholesterol*

According to the method described in Example 14, 2 g. 3α,5α-cyclo-pregnane-6β,20α$_F$-diol-6-methyl ether are reacted to form 22-oxa-25-aza-i-cholesterol-6-methyl ether. This 6-methyl ether is dissolved in 30 ml. dioxane and refluxed for one hour with 5 ml. 5% sulfuric acid. The solution is allowed to cool and made alkaline with an aqueous solution of $NaHCO_3$. The 22-oxa-25-aza-cholesterol is extracted with chloroform and purified by chromatography over basic $Al_2O_3$. M.P. 158–160° C. (acetone).

EXAMPLE 18

*22-oxa-cholesterol*

1 g. 5-pregnene-3β,20α$_F$-diol-3-tetrahydropyranyl ether is dissolved in 150 ml. xylene. Subsequently, 10 ml. of the obtained solution are distilled off. The solution dried in this manner is added under nitrogen to a suspension of 72 mg. sodium hydride in 15 ml. anhydrous xylene and refluxed for one hour with stirring. 2.66 g. isoamyl chloride in 20 ml. xylene are dropped into the boiling solution which is continued to boil for another five hours. After being cooled, 10 ml. water and dilute hydrochloric acid are added. The solution is extracted with ether, washed to neutrality and worked up in the usual way to form 22-oxa-cholesterol-3-tetrahydropyranylether.

To split this ether partially, the obtained compound is dissolved in dioxane and heated on the steam bath for two hours with 3% of 2 N aqueous solution of oxalic acid. The reaction mixture is diluted with water and extracted with ether whereby the 22-oxa-cholesterol is obtained.

In analogy, 5-androstene-3β,17β-diol-3-(α-ethoxyethyl)-ether is reacted with isohexyl chloride and subsequently hydrolyzed to form 20-oxa-21-nor-cholesterol. In addition, the following compounds may be obtained in a similar manner:

20,24-dioxa-21-nor-cholesterol
N-ethyl-20-oxa-21,26-bisnor-24-aza-cholesterol
N-methyl-20-oxa-21-nor-24-aza-cholesterol
N-ethyl-20-oxa-21-nor-24-aza-cholesterol

EXAMPLE 19

*23-oxa-cholesterol*

0.5 g. potassium are dissolved with cooling to about −70° C. in 300 ml. liquid anhydrous ammonia after addition of a trace ferric nitrate. The solution is stirred with exclusion of moisture until the blue color disappears. Then a solution of 2 g. 5-bisnorcholene-3β,22-diol-3-tetrahydropyranyl-ether in 20 ml. dioxane is added dropwise. After stirring for another 1–2 hours, 1.75 g. isobutyl bromide in 10 ml. dioxane are added and the solution is stirred for 5–6 hours. The amonia is evaporated and the solution is poured into ice, acidified and extracted with ether. By working up the reaction mixture in the usual way, the 23-oxa-cholesterol-3-tetrahydropyranyl ether is obtained which may be split according to the method described in Example 18 to form 23-oxa-cholesterol.

In a similar manner, 5-androstene-3β,17β-diol-3-tetrahydropyranylether is reacted with isoamyl bromide and hydrolyzed subsequently to form 20-oxa-21,24-bisnor-cholesterol. In analogy, the following compounds may be prepared:

20-oxa-21-nor-cholestanol
20-oxa-21,24-bisnor-cholestanol
20,24-dioxa-21-nor-cholestanol
20-oxa-21-nor-25-aza-cholestanol
20-oxa-21-nor-24-aza-cholestanol
20-oxa-21,24-bisnor-25-aza-cholestanol
N-ethyl-20-oxa-21,26-bisnor-24-aza-cholestanol
N-methyl-20-oxa-21-nor-24-aza-cholestanol
N-ethyl-20-oxa-21-nor-24-aza-cholestanol
22-oxa-cholestanol
22-oxa-24-nor-cholestanol
22-oxa-25-aza-cholestanol
23-oxa-cholestanol
23-oxa-24-nor-cholestanol
24-oxa-cholestanol
20-azo-24-oxa-cholestanol

EXAMPLE 20

*24-oxa-cholesterol*

21 g. boron trifluoride etherate and 2 g. 3β-hydroxy-Δ⁵-nor-cholenic acid isopropyl ester are dissolved in 100 ml. tetrahydrofuran. The solution is added slowly with stirring at 0° C. under nitrogen to a mixture of 0.37 g. sodium borohydride in 25 ml. diethylene glycol dimethyl ether. The reaction mixture is allowed to stand for three hours with cooling and then is refluxed for one hour. Upon cooling methanol is added to the solution which then is acidified with dilute HCl, and diluted with water. It is extracted with ether, washed to neutrality, dried and chromatographed over silica gel. Elution with petroleum ether yields 24-oxa-cholesterol which is recrystallized.

In a similar way 20,24-dioxa-21-nor-cholesterol is obtained by reduction of 5-androstene-3β,17β-diol-17-(isopropyloxy)-acetate and 20-oxa-nor-24-aza-cholesterol by reduction of 5-androstene-3β,17β-diol-17-isopropylaminoacetate.

EXAMPLE 21

*22-oxa-24-nor-cholesterol*

30 g. isobutanol are added dropwise to a boiling solution of 2 g. 5-pregnene-3β-20β$_F$-diol-3-acetate-20-p-toluene sulfonate in 100 ml. benzene with stirring and under nitrogen. The mixture is refluxed for 1½ hours and is diluted with ether after being cooled and washed to neutrality with aqueous Na$_2$CO$_3$ and water. From the residue of the dry solution 22-oxa-24-nor-cholesterol-3-acetate is obtained which is saponified with methanolic potassium hydroxide at room temperature to form 22-oxa-24-nor-cholesterol.

EXAMPLE 22

*23-oxa-24-nor-cholesterol-3-acetate*

2.4 g. sodium hydride are added to a mixture of 6 g. isopropanol and 200 ml. dry xylene. The suspension is refluxed under nitrogen for one hour. 3.9 g. 3β-acetoxy-22-chloro-Δ⁵-bisnorcholen in 50 ml. dry xylene are added with stirring to the boiling mixture which is refluxed for another 7 hours. Upon cooling, methanol and dilute hydrochloric acid are added until the reaction is slightly acidic. It is worked up in the usual way to form 23-oxa-24-nor-cholesterol-3-acetate.

EXAMPLE 23

*20-oxa-21,24-bisnor-25-aza-cholesterol*

In accordance with the method described in Example 14, 20-oxa-21,24-bisnor-25 - aza-cholesterol - 3-tetrahydropyranyl-ether is obtained from 5-androstene-3β,17β-diol-3-tetrahydropyranyl ether. M.P. 98–102° C. (acetone); [α]$_D^{24}$ −31° (CHCl$_3$). This ether is split to form 20-oxa-21,24-bisnor-25-aza-cholesterol. M.P. 158–161° (acetone); [α]$_D^{24}$ −52° (chloroform).

EXAMPLE 24

*22-oxa-25-aza-cholestane-3β-ol*

5 g. 22-oxa-25-aza-cholesterol are dissolved in 100 ml. methyl acetate and hydrogenated in the presence of 500 ml. PtO$_2$. When the calculated amount of hydrogen has been absorbed, the catlyst is filtered off and the filtrate evaporated to dryness. The obtained 22-oxa-25-aza-cholestane-3β-ol is recrystallized from acetone. Double M.P. 135–136° and 144–145°; [α]$_D^{20}$ +34° (chloroform).

In analogy the 20-oxa-21-nor-25-aza-cholestanol, M.P. 137–138°; [α]$_D^{20}$ +8 (chloroform), is obtained from 20-oxa-21-nor-25-aza-cholesterol.

In analogy the following compounds may be prepared:

20-oxa-21-nor-cholestanol
20-oxa-21,24-bisnor-cholestanol
20,24-dioxa-21-nor-cholestanol
20-oxa-21-nor-24-aza-cholestanol
20-oxa-21,24-bisnor-25-aza-cholestanol
N-ethyl-20-oxa-21,26-bisnor-24-aza-cholestanol
N-methyl-20-oxa-21-nor-24-aza-cholestanol
N-ethyl-20-oxa-21-nor-24-aza-cholestanol
22-oxa-cholestanol
22-oxa-24-nor-cholestanol
23-oxa-cholestanol
23-oxa-24-nor-cholestanol
24-oxa-cholestanol
20-aza-24-oxa-cholestanol
3-chloro-20-oxa-21-nor-cholestane
3-chloro-20-oxa-21,24-bisnor-cholestane
3chloro-20,24-dioxa-21-nor-cholestane
3-chloro-20-oxa-21-nor-25-aza-cholestane
3chloro-20-oxa-21-nor-24-aza-cholestane
3-chloro-20-oxa-21,24-bisnor-25-aza-cholestane
3-chloro-N-ethyl-20-oxa-21,26-bisnor-24-aza-cholestane
3-chloro-N-methyl-20-oxa-21-nor-24-aza-cholestane
3-chloro-N-ethyl-20-oxa-21-nor-24-aza-cholestane
3-chloro-22-oxa-cholestane
3-chloro-22-oxa-24-nor-cholestane
3-choloro-22-oxa-25-aza-cholestane
3-chloro-23-oxa-cholestane
3-chloro-23-oxa-24-nor-cholestane
3-chloro-24-oxa-cholestane
3-chloro-20-aza-24-oxa-cholestane

EXAMPLE 25

*3β-chloro-22-oxa-25-aza-5-cholestene*

3 g. 22-oxa-25-aza-cholesterol are dissolved in 120 ml. ether. 3 g. dry and freshly prepared CaCO$_3$ and 60 ml. thionyl chloride are added with stirring at 15° C. The reaction mixture is allowed to stand for four hours at room temperature and then is evaporated. The residue is chromatographed over basic Al$_2$O$_3$ to form the pure 3β-chloro-22-oxa-25-aza-5-cholestene. M.P. 97–98° (acetone); [α]$_D^{20}$ −22° (chloroform).

In analogy, the following compounds may be prepared:

3-chloro-20-oxa-21-nor-5-cholestene
3-chloro-20-oxa-21,24-bisnor-5-chloestene
3-chloro-20,24-dioxa-21-nor-5-cholestene
3-chloro-20-oxa-21-nor-25-aza-5-chloestene
3-chloro-20-oxa-21-nor-24-aza-5-cholestene
3-chloro-20-oxa-21,24-bisnor-25-aza-5-cholestene
3-chloro-N-ethyl-20-oxa-21,26-bisnor-24-aza-5-cholestene
3-chloro-N-methyl-20-oxa-21-nor-24-aza-5-cholestene
3-chloro-N-ethyl-20-oxa-21-nor-24-aza-5-cholestene
3-chloro-22-oxa-5-cholestene
3-chloro-22-oxa-24-nor-5-cholestene
3-chloro-23-oxa-5-cholestene
3-chloro-23-oxa-24-nor-5-cholestene
3-chloro-24-oxa-5-cholestene
3-chloro-20-aza-24-oxa-5-cholestene

EXAMPLE 26

*22-oxa-25-aza-cholesterol-3-acetate*

1 g. 22-oxa-25-aza-cholesterol is refluxed with 10 ml. acetic acid anhydride and 10 ml. pyridine for 2 hours. The mixture is evaporated to dryness and the residue is worked up in the usual way with chloroform and water to form 22-oxa-25-aza-cholesterol-3-acetate.

EXAMPLE 27

*22-oxa-25-aza-cholesterol-3-methyl ether*

2 g. 22-oxa-25-aza-cholesterol are reacted with tosyl chloride to form the corresponding 3-p-toluene sulfonic acid ester. The ester is refluxed in 30 ml. methanol for 45 minutes and then worked up in the usual way to form 22-oxa-25-aza-cholesterol-3-methyl-ether.

If instead of methanol ethanol, isopropanol, n-, iso- or tert.-butanol is used, the corresponding 3-ethyl-, 3-propyl-, or 3-butyl ether is obtained.

All compounds which may be prepared corresponding to the present invention having a hydroxy group in the 3-position may be etherified in this way. It has to be noted, however, that in the case of secondary amines the p-toluene sulfonic acid ester has to be prepared under acidic reaction conditions.

EXAMPLE 28

*20-oxa-21-nor-25-aza-cholestanol*

In accordance with the method decribed in Example 13, 20-oxa-21-nor-25-aza-cholesterol-3-tetrahydropyranyl-ether is obtained by reaction of androstane $3\beta,17\beta$-diol-3-tetrahydropyranyl-ether with $\gamma$-bromopropyl dimethyl ammonium bromide. M.P. 63–65° (acetone); $[a]_D^{20}$ +4.4° (chloroform). Hydrolysis yields 20-oxa-21-nor-25-aza-cholestanol. M.P. 137–138° (acetone); $[\alpha]_D^{20}$ +8° (chloroform).

In analogy, the following compounds may be prepared:

20-oxa-21,24-bisnor-25-aza-cholestane-$3\beta$-ol
22-oxa-25-aza-cholestane-$3\beta$-ol
N-ethyl-20-oxa-21,27-bis-nor-24-aza-cholestane-$3\beta$-ol

EXAMPLE 29

*20-aza-24-oxa-cholestanol*
*20-aza-24-oxa-cholesterol*

In accordance with the method described in Example 16, 20-aza-24-oxa-cholestanol-3-acetate is obtained from $17\beta$-[(N-methyl - N - $\beta$ - hydroxyethyl)-amino]-androstane-$3\beta$-ol-3-acetate. M.P. 65–69° C. (acetone).

By saponification with 5% methanolic potassium hydroxide, the 20-aza-24-oxa-cholestane-$3\beta$-ol is obtained which is purified by recrystallization from petroleum ether. M.P. 101–104° C.

In a similar manner, the 20-aza-24-oxa-cholesterol-3-acetate is obtained. According to Example 16, it is converted into 20-aza-24-oxa-cholesterol by saponification with methanolic KOH. The crude product recrystallizes from petroleum ether. M.P. 87–89° C.; $[\alpha]_D^{22}$ −59° (chloroform).

EXAMPLE 30

*$3\beta$-chloro-20-aza-24-oxa-5-cholestene*

3 g. 20-aza-24-oxa-cholesterol are dissolved in 120 ml. ether and reacted with 3 g. dry CaCO$_3$ and 16 ml. thionyl chloride at 15° C. with stirring. The reaction mixture is allowed to stand for four hours at room temperature. Then the solvent is evaporated under reduced pressure. The residue is chromatographed over basic Al$_2$O$_3$. The obtained product is dissolved in ethereal hydrochloric acid and recrystallized from chloroform/ether. The $3\beta$-chloro-20-aza-24-oxa-5-cholestene melts at 239–240° C.; $[\alpha]_D^{20}$ −33° (chloroform).

EXAMPLE 31

*N-ethyl-20-oxa-21,26-bisnor-24-aza-cholesterol*

In accordance with Example 14, 5-androstene-$3\beta,17\beta$-diol-3-tetrahydropyranyl ether is reacted with $\beta$-chloro ethyl diethyl amine to form N-ethyl-20-oxa-21,26-bisnor-24-aza-cholesterol-3-tetrahydropyranyl-ether. M.P. 100–103° C. (acetone); $[\alpha]_D^{22}$ −29° (chloroform). Acid hydrolysis yields N-ethyl-20-oxa-21,26-bisnor-24-aza-cholesterol. M.P. 100–103° (acetone); $[\alpha]_D^{20}$ −51° (chloroform).

EXAMPLE 32

*N-ethyl-20-oxa-21-nor-24-aza-cholesterol*

In accordance with Example 14, 5-androestene-$3\beta,17\beta$-diol-3-tetrahydropyranyl-ether is reacted with $\beta$-(ethyl-isopropyl-amino)-ethyl chloride to form N-ethyl-20-oxa-21-nor-24-aza-cholesterol-3-tetrayhdropyranyl-ether. M.P. 104–107° (acetone); $[\alpha]_D^{20}$ −34° (chloroform). Acid hydrolysis yields N-ethyl-20-oxa-21-nor-24-aza-cholesterol. M.P. 87–89° C. (acetone); $[\alpha]_D^{20}$ −45° (chloroform).

EXAMPLE 33

*N-methyl-20-oxa-21-nor-24-aza-cholesterol*

In accordance with Example 14, 5-androstene-$3\beta,17\beta$-diol-3-tetrahydropyranyl-ether is reacted with $\beta$-(methyl-isopropyl-amino)-ethyl bromide to form N-methyl-20-oxa-21-nor-24-aza-cholesterol - 3-tetrahydropyranyl-ether. M.P. 131–133° C. (acetone); $[\alpha]_D^{20}$ −36° (chloroform). Acid hydrolysis yields N-methyl-20-oxa-21-nor-24-aza-cholesterol. M.P. 117–119° (acetone); $[\alpha]_D^{20}$ −51° (chloroform).

EXAMPLE 34

*20-aza-24-nor-cholesterol-propionate*

The solution of 7 g. 5 - androstene - $3\beta$-ol-17-on-3-propionate in 100 ml. benzene and 30 ml. isoamyl amine is distilled azeotropically after addition of 1 g. p-toluene sulfonic acid. After four hours, the mixture is washed to neutrality with water and the dried benzene solution is concentrated. The crude crystallized 17-(3'-methyl)-butylamino-5-androstene-$3\beta$-ol-propionate is dissolved in 200 ml. anhydrous tetrahydrofuran. The solution is added dropwise to a boiling suspension of 5 g. NaBH$_4$ in 200 ml. anhydrous ether. The reaction mixture is refluxed for another 2 hours, then the excess of the hydride is destroyed by addition of methanol and water. 14 g. sodium potassium tartrate are added and the separated aqueous layer is extracted with ether. From the extracts, the 20-aza-21,24-bisnor-cholesterol-propionate is obtained by evaporation.

1.9 g. 20-aza-21,24-bisnor-cholesterol-propionate, 2.4 g. 90% formic acid and 2 g. 35% aqueous formaldehyde are heated on a steam bath for 18 hours. The reaction mixture is diluted with water, acidified with hydrochloric acid to pH 3 and extracted with ether. The aqueous layer is made alkaline with NaOH and the separated 20-aza-24-nor-cholesterol-propionate is filtered off and recrystallized from petroleum ether.

To obtain the corresponding hydrochloride, 0.1 g. of the base thus obtained are dissolved in methanol and this solution is treated with an excess of ethereal hydrochloric acid. The separating salt recrystallizes from methanol.

EXAMPLE 35

*20-aza-24-nor-cholestane-butyrate*

In analogy to Example 34, 20-aza-24-nor-cholestane-butyrate is obtained from androstane - $3\beta$ - ol - 17 - on-butyrate.

EXAMPLE 36

*20-aza-cholesterol*

2.5 g. 20-aza-21-nor-cholesterol are heated overnight on the steam bath with 3.1 g. 90% formic acid and 2.6 g. 35% aqueous formaldehyde. The reaction mixture is filtered with water, acidified with hydrochloric acid and extracted with small amounts of ether. The aqueous layer is made alkaline with NaOH and the separated 20-aza-cholesterol is filtered off, dried, and recrystallized from acetone.

In analogy, N-methyl-22-aza-cholestanol hydrochloride, M.P. 263° (decomposition, from ether) and 20-aza-24-nor-cholesterol-hydrochloride, M.P. 251–252° (decomposition, methanol/acetone) are prepared.

In a similar manner, N-methyl-22-aza-cholesterol is obtained from 22 - aza - cholesterol, N - methyl - 23 - aza-cholesterol is obtained from 23-aza-cholesterol, N-methyl-24-aza-cholesterol is obtained from 24-aza-cholesterol, and N-methyl-20,24-diaza-cholesterol is obtained from 20,24-diaza-cholesterol.

EXAMPLE 37

*N-methyl-20-oxa-21-nor-24-aza-cholesterol*

In accordance with the method described in Example 36, 7.2 g. 20-oxa-21-nor-24-aza-cholesterol are reacted to form N-methyl-20-oxa-21-nor-24-aza-cholesterol. M.P. 117–119° C. (acetone); $[\alpha]_D^{20}$ −51° (chloroform).

EXAMPLE 38

*20-aza-24-oxa-cholesterol and its hydrochloride*

6.5 g. 17β-N-methylamino-5-androstene-3β-ol are dissolved in 40 ml. anhydrous benzene and 4.2 g. triethyl amine. 11.3 g. isopropoxy acetylchloride in 10 ml. anhydrous benzene are added dropwise with ice cooling. The mixture is heated for 2 hours on the steam bath, cooled and poured into 500 ml. 5% aqueous NaHCO₃ and extracted with chloroform. The extract is washed with water, dried and evaporated. The crude product is chromatographed in benzene over 170 g. silica gel. The 17β-N - methyl - amino - 5 - androstene - 3β - ol - 3,17 - di - [(isopropoxy)-acetate] is eluated with benzol/chloroform 7:3 and 1:1 and is recrystallized from acetone. M.P. 124–126°; $[\alpha]_D^{24}$ −102° (chloroform).

3. g. of this ester are dissolved in 45 ml. anhydrous ether and dropped with ice cooling into a suspension of 700 mg. LiAlH₄ in 30 ml. anhydrous ether. The mixture is refluxed for 3 hours and the excess of hydride is then decomposed by addition of 10 ml. water. It is poured into 60 ml. 20% NaOH and extracted with ether. By working it up in the usual way, the 20-aza-24-oxa-cholesterol is obtained M.P. 87–89° C.; $[\alpha]_D^{22}$ −59° (choroform).

To prepare the corresponding hydrochloride, the obtained product is dissolved in 50 ml. anhydrous ether. Dry gaseous HCl is introduced into the solution with stirring and under nitrogen. The crystalline hydrochloride separates. $[\alpha]_D^{24}$ −35° (methanol).

In analogy, 20-aza-24-oxa-cholestane-3β-ol may be prepared. M.P. 101–104° C.

EXAMPLE 39

*N-ethyl-20-oxa-21-nor-24-aza-cholesterol*

3.9 g. 20-oxa-21-nor-24-aza-cholesterol are refluxed with 80 ml. ethanol and 1.2 g. ethyl bromide for 5 hours. The mixture is evaporated to dryness and the obtained N-ethyl-20-oxa-21-nor-24-aza-cholesterol is purified by chromatography over basic Al₂O₃. M.P. 87–89° (acetone); $[\alpha]_D^{20}$ −45° (chloroform).

EXAMPLE 40

*N-ethyl-22-aza-cholesterol*

2 g. 22-aza-cholesterol are refluxed for 3 hours with 10 ml. pyridine and 10 ml. acetic acid anhydride. The mixture is poured into ice water, the precipitate is filtered off and dried. The crude 3,22-diacetyl compound is reduced with LiAlH₄ as described in Example 35 to form N-ethyl-22-aza-cholesterol.

In analogy the following compounds may be prepared—

N-ethyl-22-aza-cholestanol-hydrochloride, M.P. 260° (decomp.),
N-ethyl-22-aza-24-nor-cholesterol, M.P. 140–142° (methanol),
$[\alpha]_D$+16° (dioxane) hydrochloride: M.P. 254° (decomp. from methanol/ether),
N-ethyl-22-aza-24-nor-cholestanol, M.P. 148–150° (methanol),
$[\alpha]_D$+66° (chloroform), hydrochloride: M.P. 250–253° (acetone),
$[\alpha]_D$+17° (chloroform),
N-ethyl-24-aza-26-nor-cholestan-3β-ol,
N-ethyl-23-aza-cholesterol,
24-ethyl-24-aza-cholesterol,
N-ethyl-20,24-diaza-cholesterol.

EXAMPLE 41

*20-aza-cholestanol*

2.5 g. 20-aza-cholesterol are hydrogenated in a solution of 60 ml. methyl acetate in the presence of 0.25 g. PtO₂. When the reaction is terminated, the catalyst is filtered off and the filtrate is evaporated to dryness. The 20-aza-cholestane-3β-ol is recrystallized from acetone.

EXAMPLE 42

*20-aza-24-oxa-cholestane-3β-ol*

According to the method described in Example 24, 20-aza-24-oxa-cholestane-3β-ol is obtained by hydrogenation of 20-aza-24-oxa-cholesterol at 62° C. and a pressure of 6 atm. M.P. 101–104° (petroleum ether).

EXAMPLE 43

*3β-chloro-20-aza-5-cholestene*

30 ml. thionyl chloride are added dropwise at about 15° C. to a mixture of 1.5 g. 20-aza-cholesterol in 60 ml. ether and 1.5 g. dry CaCO₃. The mixture is allowed to stand for 5 hours at room temperature and then is evaporated. The residue is chromatographed over basic Al₂O₃ whereby 3β-chloro-20-aza-5-cholestene is obtained.

In analogy the following compounds may be prepared—

3β-chloro-20-oxa-21-nor-25-aza-5-cholestene
3β-chloro-20-oxa-21,24-bisnor-25-aza-5-cholestene
3β-chloro-N-ethyl-20-oxa-21,27-bisnor-24-aza-5-cholestene
3β-chloro-N-methyl-20-oxa-21-nor-24-aza-5-cholestene
3β-chloro-N-ethyl-20-oxa-21-nor-24-aza-5-cholestene

EXAMPLE 44

*3β-chloro-20-aza-24-nor-5-cholestene*

The solution of 8 g. 3β-chloro-5-androstene-17-one in 100 ml. benzene and 20 ml. isoamyl amine is distilled azeotropically with 1 g. p-toluene sulfonic acid. After 2½ hours, another 20 ml. isamyl amine are added. The cold reaction mixture is washed with water to neutrality. The benzene solution is dried over CaCO₃ and concentrated. The amorphous residue of 3β-chloro-17-(3-methyl)-butyl-imino-5-androstene is dissolved in 100 ml. anhydrous tetrahydrofuran without further purification and is added dropwise into a suspension of 7.5 g. NaBH₄ into 200 ml. ether. The mixture is stirred for 30 minutes at room temperature and then is refluxed for 2 hours. After cooling, the excess of NaBH₄ is decomposed with methanol and is extracted with ether after addition of 20 g., sodium potassium tartrate. From the dried extracts 3β-chloro-20-aza-21,24-bisnor-5-cholestene is isolated.

3.1 g. of 3β-chloro-20-aza-21,24-bisnor-5-cholestene, 2.6 g. 90% formic acid and 2 g. 35% aqueous formaldehyde are heated on the steam bath for 20 hours. The reaction mixture is diluted with water, acidified to pH 2 with HCl and extracted with ether. The aqueous layer is made alkaline with NaOH and the 3β-chloro-20-aza-24-nor-5-cholestene is filtered off and recrystallized from acetone.

In analogy, 3β-chloro-20-aza-24-nor-cholestane is obtained from 3-chloro-androstane-17-one.

EXAMPLE 45

*20-aza-cholesterol-3-propionate*

1.5 g. 20-aza-cholesterol are allowed to stand overnight at room temperature with 7.5 ml. propionic acid anhydride and 7.5 ml. pyridine. The reaction mixture is poured into water and the separated 20-aza-cholesterol-3-propionate is filtered off and recrystallized from petroleum ether.

EXAMPLE 46

*22-aza-24-nor-cholesterol*
*22-aza-24-nor-cholestanol*

7 ml. isobutyric acid chloride are added with stirring at 0° C. to a solution of 7 g. 20α-amino-allopregnane-3β-ol in 70 ml. pyridine. The reaction mixture is allowed to stand for 2 hours at room temperature, then is diluted with water and the separated 20α-amino-allopregnane-3β-ol-diisobutyrate is filtered off. After recrystallization (M.P. 228–229° from methanol) it is dissolved in 320 ml. dioxane and refluxed for 18 hours with a suspension of 5.8 g. LiAlH$_4$ in 100 ml. dioxane. 5 ml. water are added after cooling, then the mixture is heated to the boiling point with 4.5 ml. 20% NaOH. The precipitate is filtered off after addition of 30 ml. water. The filtrate is concentrated and the residue consisting of 22-aza-24-nor-cholestane-3β-ol is crystallized from methanol. M.P. 161–162°, [α]$_D$ +24° (alcohol).

With ethereal hydrochloric acid, the hydrochloride of 22-aza-24-nor-cholestanol is precipitated from the methanolic solution. M.P. 335–336° (decomp., from methanol).

In analogy, the 22-aza-24-nor-cholesterol (M.P. 130–131°, methanol) is obtained from 20α-amino-5-pregnene-3β-ol; the hydrochloride melts at >280°.

EXAMPLE 47

*23-aza-24-nor-cholestane-3β-ol*

The solution of 3.1 g. of the 3-acetate of bisnor cholenic acid isopropyl amide in 60 ml. anhydrous ether is dropped into a suspension of 1 g. LiAlH$_4$ in 50 ml. ether. The mixture is refluxed overnight and decomposed after cooling with aqueous NaOH. By working up the reaction mixture in the usual way, the 23-aza-24-nor-cholestane-3β-ol is obtained in crystalline form.

EXAMPLE 48

*25-aza-cholesterol*

3 g. 3β-hydroxy-5-cholenic acid dimethyl amide dissolved in 100 ml. anhydrous dioxane are dropped into a suspension of 1.5 g. LiAlH$_4$ and the mixture is refluxed for 18 hours. The excess of hydride is decomposed with a mixture of dioxane and water. 1–2 ml. 20% NaOH are added to the reaction mixture which is heated to the boiling point and filtered in the hot after addition of small amounts of water.

The residue is washed with dioxane and the combined filtrates are concentrated. The obtained 25-aza-cholesterol is recrystallized from acetone.

EXAMPLE 49

*20-aza-24-oxa-cholestanol-3-acetate*

1 g. 20-aza-24-oxa-cholestanol is refluxed with 10 ml. pyridine and 10 ml. acetic acid anhydride. The mixture is evaporated and the residue is worked up in the usual way with chloroform and water. The 20-aza-24-oxa-cholestanol-3-acetate melts at 65–69°.

In a similar manner, all compounds obtainable according to the present invention may be acylated if they do not contain a secondary nitrogen atom. For an acylation with acids of longer chain length preferably the acid chlorides are used instead of the anhydrides, e.g. trimethylacetyl chloride, caprylic chloride, undecylenic acid chloride, stearylic chloride, benzoyl chloride.

The acid addition salts of the cholesterol derivatives containing nitrogen are obtained by dissolving the bases in ethanol and adding the corresponding acid, e.g. hydrochloric acid in ether.

The following examples relate to preferred pharmaceutical compositions:

I. TABLETS

Each tablet contains

| | Mg. |
|---|---|
| 20-aza-24-oxa-cholestanol | 50 |
| Lactose | 120 |
| Corn starch | 30 |
| Talc | 2 |

II. DRAGEES (COATED TABLETS)

The compressed cores contain

| | Mg. |
|---|---|
| N-ethyl-22-aza-24-nor-cholesterol | 40 |
| Lactose | 80 |
| Potato starch | 10 |

The cores were then coated, according to conventional methods, with a mixture of wheat starch, sugar, talc and tragacanth.

III. TABLETS

| | Kg. |
|---|---|
| 22-oxa-25-aza-cholestanol | 0.100 |
| Lactose | 0.500 |
| Corn starch | 0.200 |
| Talc | 0.150 |
| Magnesium stearate | 0.050 |

The ingredients were mixed and stamped into 10,000 tablets so that the dosage unit is 10 mg./tablet.

IV. DRAGEES (COATED TABLETS)

The core contains

| | Mg. |
|---|---|
| 22-oxa-25aza-cholesterol | 20 |
| Lactose | 100 |
| Starch | 50 |
| Talc | 10 |

The cores were then coated with a tinted sugar solution.

V. TABLETS

Each tablet contains

| | Mg. |
|---|---|
| 20-oxa-21-nor-25-aza-cholesterol | 25 |
| Lactose | 120 |
| Corn starch | 25 |
| Magnesium stearate | 5 |

VI. TABLETS

There were mixed

| | Kg. |
|---|---|
| 22-aza-cholestanol | 3.0 |
| Lactose | 8.0 |
| Corn starch | 2.0 |
| Talc | 1.0 |
| Magnesium stearate | 0.6 |

The mixture was then formed into 100,000 tablets so that the dosage unit is 30 mg./tablet.

VII. TABLETS

Each tablet contains

| | Mg. |
|---|---|
| 20-aza-24-oxa-cholesterol | 40 |
| Starch | 20 |
| Lactose | 100 |
| Talc | 8 |

VIII. TABLETS

Each tablet contains

| | Mg. |
|---|---|
| 20-oxa-21-nor-25-aza-cholestanol | 15 |
| Lactose | 120 |
| Potato starch | 60 |
| Magnesium stearate | 3 |

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A member of the group consisting of a compound of the formula

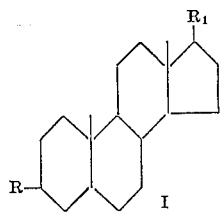

and the 5-dehydro-derivatives and the acid-addition salts thereof, wherein:
R is selected from the group consisting of: chloro, hydroxy, O-alkyl of 1–4 carbon atoms, and O-acyl of 1–18 carbon atoms;
$R_1$ is selected from the group consisting of:

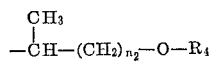

having a total of 6–7 carbon atoms,

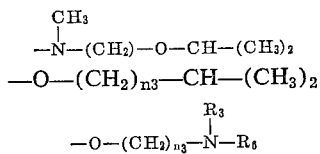

having a total of 4–7 carbon atoms, and

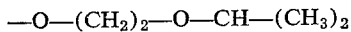

$R_2$ is selected from the group consisting of methyl, ethyl, isopropyl, isobutyl, isopentyl, 1-methylpropyl, 1-ethylpropyl, 2-methylbutyl, and 2-ethylbutyl;
$R_3$ is selected from the group consisting of hydrogen, methyl and ethyl;
$R_4$ is selected from the group consisting of isopropyl, isobutyl, and isopentyl;
$R_5$ is selected from the group consisting of isopropyl, isobutyl, 1-methylpropyl, and 1-ethylpropyl;
$R_6$ is selected from the group consisting of methyl, ethyl and isopropyl;
$n_1$ is an integer in the range of 0–3;
$n_2$ is an integer in the range of 0–2; and
$n_3$ is an integer in the range of 2–3.
2. 20-oxa-21-nor-25-aza-cholesterol.
3. 20-oxa-21,24-bis-nor-25-aza-cholesterol.
4. N-ethyl-20-oxa-21,26-bis-nor-24-aza-cholesterol.
5. 3β-chloro-22-oxa-25-aza-5-cholestene.
6. 20-aza-24-oxa-cholestane-3β-ol.
7. N-ethyl-20-oxa-21-nor-24-aza-cholesterol.
8. 20-aza-24-oxa-cholesterol.
9. 20-oxa-21-nor-25-aza-cholestane-3β-ol.
10. 20-oxa-21-nor-cholestane-3β-ol.
11. 20-oxa-21,24-bis-nor-cholestane-3β-ol.
12. 22-oxa-cholestane-3β-ol.
13. 22-oxa-24-nor-cholestane-3β-ol.
14. 23-oxa-cholestane-3β-ol.
15. 23-oxa-24-nor-cholestane-3β-ol.
16. 24-oxa-cholestane-3β-ol.
17. A pharmaceutical composition in dosage unit form comprising a pharmaceutically acceptable carrier and 2–300 mg. of a compound in accordance with claim 1.
18. A method of treating a mammal having hypercholesteremia, which method comprises administering to said mammal an effective dosage of a compound in accordance with claim 1.

References Cited

UNITED STATES PATENTS

| | | | |
|---|---|---|---|
| 3,013,008 | 12/1961 | Counsell | 260—239.5 |
| 3,038,912 | 6/1962 | Nysted | 260—397.1 |
| 3,084,156 | 4/1963 | Counsell et al. | 260—239.5 |
| 3,097,200 | 7/1963 | Kincl | 260—239.5 |
| 3,144,471 | 8/1964 | Nelson | 260—397.5 |

LEWIS GOTTS, *Primary Examiner.*
HENRY A. FRENCH, *Assistant Examiner.*